United States Patent [19]

Leep et al.

[11] 4,365,028

[45] Dec. 21, 1982

[54] COATING COMPOSITION

[75] Inventors: Gus W. Leep, Elgin; Morris J. Root, Highland Park, both of Ill.

[73] Assignee: Seymour of Sycamore, Inc., Sycamore, Ill.

[21] Appl. No.: 272,784

[22] Filed: Jun. 11, 1981

[51] Int. Cl.$^3$ ................. C08L 23/00; C08L 63/00; C08L 67/02; C08L 75/06

[52] U.S. Cl. ................. 523/402; 524/364; 524/378; 524/389; 524/475; 524/539; 524/556; 524/570; 524/577; 524/588; 524/591; 524/601; 524/903

[58] Field of Search ........... 106/311; 260/29.2 EP, 260/23 S, 29.2 M, 29.6 WQ, 29.6 PM, 29.6 MM, 22 A, 18 TN, 22 CB; 523/402; 524/364, 378, 389, 475, 539, 556, 570, 577, 588, 591, 601, 903

[56] References Cited

U.S. PATENT DOCUMENTS

| | | | |
|---|---|---|---|
| 2,921,041 | 1/1960 | Francis | 260/23.3 |
| 3,474,057 | 10/1969 | De Vries | 260/23.3 |
| 3,484,260 | 12/1969 | Emslie et al. | 260/29.6 MM |
| 3,928,667 | 12/1975 | Carlos et al. | 260/29.6 ME |
| 3,997,492 | 12/1976 | Kane et al. | 260/29.6 MH |
| 3,998,775 | 12/1976 | Taub | 260/29.6 MN |
| 4,014,841 | 3/1977 | Taub | 260/29.6 MH |
| 4,070,510 | 1/1978 | Kahn | 427/385 R |
| 4,071,645 | 1/1978 | Kahn | 427/340 |
| 4,123,404 | 10/1978 | Lasher | 260/29.4 R |
| 4,147,681 | 4/1979 | Lim et al. | 260/29.6 WQ |
| 4,177,177 | 12/1979 | Vanderhoff et al. | 260/29.6 MN |
| 4,179,440 | 12/1979 | Martinez | 260/29.2 EP |
| 4,187,204 | 2/1980 | Howard | 260/29.2 EP |
| 4,252,706 | 2/1981 | Phillips et al. | 260/29.6 PM |
| 4,265,797 | 5/1981 | Suk | 260/29.6 E |

*Primary Examiner*—Ronald W. Griffin
*Attorney, Agent, or Firm*—Trexler, Bushnell & Wolters, Ltd.

[57] ABSTRACT

There is disclosed an emulsion coating composition having water dispersed in an organic solvent soluble resin and solvent through the use of an emulsifier having a hydrophile-lipophile balance of from two to about six. The composition may be mixed with a hydrocarbon propellant miscible in the continuous phase in suitable containers to produce a non-foaming water containing aerosol spray paint or varnish.

13 Claims, No Drawings

COATING COMPOSITION

BACKGROUND OF THE INVENTION

The present invention relates generally to coating compositions and specifically to a solvent soluble resin paint or varnish having water dispersed therein.

It has been a desideratum in the coatings art to formulate a paint, varnish or other protective coating composition which employs an organic solvent soluble film-forming component and which further includes water as part of the evaporative vehicle.

Presently such compositions, commonly called solvent or solution resin coatings, comprise organic solvents as the evaporative vehicle, often in amounts in excess of 60% of the total composition. As this solvent evaporates during the drying of the coating, considerable irritation and odor may be caused by the escape of these fumes in the atmosphere. Also, organic solvents are not inexpensive, and contribute substantially to the cost of the coating composition. In addition, as organic solvents are highly flammable they are hazardous during the manufacture and use of the coatings, and add to the fireload and insurance costs of manufacturing and warehouse facilities. For these reasons, it has been desirable to substitute water for part of the solvents previously employed.

Heretofore, water containing coatings have required water soluble or dispersable film-forming components, and latex paint, for example, has met with wide acceptance. Latex paint is composed of two dispersions. First, a dispersion of pigments and various extenders in water, and second, a dispersion of the resin in the water. The resin dispersion is either a latex formed by emulsion polymerization or a resin in emulsion form. Such paints are characterized by the fact that the film-forming component is in a water-dispersed form. The principle film-forming components in latex paints are styrene-butadiene, polyvinyl acetate, and acrylic resins.

However, latex coating compositions are not without their disadvantages. First, as the latex composition is a double dispersion, it requires two emulsifiers which may conflict and may, in particular, cause problems in formulation due to the fact that the emulsifier used in the polymerization of the resin may be unknown and have an unpredictable effect on the final product. In addition, the oil-in-water emulsion found in latex compositions will not dry to produce the clear or gloss finish found in solvent coatings such as varnish and the like. Oil-in-water emulsion clear coatings, due to the latex resins used, tend to form with brush marks or surface disruptions and cannot be easily sanded or otherwise refinished as can traditional solvent varnishes.

Also, latex coatings are not easily adaptable to use in pressurized cans commonly referred to as aerosol containers. This is due to the high viscosity of the latex composition and the tendency of the latex oil-in-water emulsion to foam excessively when sprayed from an aerosol container. This foaming begins, as the composition leaves the nozzle and becomes apparent after the coating has been applied to the substrate or workpiece. For example, previous water base spray paints dry with small craters rather than a smooth surface which indicates that foaming has occurred during the application process. Thus, when the foam dries there is left a penetrable film which seriously affects the protective value of the coating. In addition, as the propellant must be miscible in the continuous phase in order to properly atomize the emulsion for spraying, suitable i.e. water soluble propellants have led to an excessive product cost and have been otherwise unsatisfactory.

SUMMARY OF THE INVENTION

This invention comprises a water-in-oil emulsion coating composition having a continuous phase including an organic solvent and a film-forming resin dissolved in said solvent, with water dispersed in the continuous phase through the use of a suitable emulsifier. The composition may be applied by brush, roller or compressed air spraying apparatus as well as being advantageously suited to being sprayed from aerosol containers such as by the inclusion of an oil-phase soluble propellant. As hereinafter described, the water-in-oil emulsion is maintained through the use of an emulsifier or an emulsifier system having a hydrophile-lipophile balance, or HLB value, of from two to about six.

Among the advantages of the present composition is that water is substituted for a large proportion of the evaporative vehicle in traditional solvent coating compositions. Thus, the invention allows the known advantages of solvent resin films to be retained in a composition having the benefits of a water base product, and a wide range of resins, including any organic solvent film-formin resin, may be used.

Substantial cost savings are attained because of the lower cost of water as compared to organic solvents. The hazards and costs of unneeded flammable solvents are also markedly reduced. Cost savings are further realized since the traditional organic solvent soluble resins are often less expensive than the resins heretofore used in latex oil-in-water emulsion paints. The present invention also enhances the functional utility of the paint as the resultant film may be sanded, stripped or otherwise refinished through the use of traditional methods.

The water-in-oil emulsion of the present invention may be sprayed from aerosol containers, which are known in the art, and atomizes readily upon spraying to produce a smooth, non-foaming coating on the workpiece to which it is applied.

The coatings referred to herein and the compositions contemplated by the present invention include those products known as varnish, paint, enamel, primers, lacquer and commercial protective coatings or any coating or composition wherein the film-forming resin is organic solvent soluble and which will form a water-in-oil emulsion as hereinafter described.

DESCRIPTION OF THE PREFERRED EMBODIMENT

The percentages expressed herein, both in the specification and the claims appended thereto, are intended and expressed as percentages by weight of the total composition to which they refer.

Solvents which are contemplated by and have been found useful in the present invention include aliphatic and aromatic hydrocarbons, esters, ketones, glycol ethers and alcohols having a distillation range of from 100° to 500° F.

Although any organic solvent soluble film-forming resin is suitable for use in the present invention, resins which are preferred for use in the water-in-oil emulsion system are those with the greatest resistance to hydrolysis. Aliphatic and aromatic hydrocarbon resins possess this characteristic to a high degree, as do vinyl toluene and styrene modified resins. Epoxy ester resins also have a high resistance to hydrolysis because of the ether groups in the molecule and resultant steric hindrance found in these resins.

The water-in-oil emulsion of the present invention is adaptable to produce varnishes, wherein a clear or gloss coating is produced from the polymerization of the resin or the evaporation of the volatile portion of the vehicle. Paints such as enamels may also be produced by the addition of various organic and inorganic pigments, including carbon black, and both natural or synthetic oxides and other known colorants as hereinafter described, along with conventional pigment dispersants and anti-settling agents. Additional ingredients known in the art may also be added, such as mar resistance agents and drier catalysts.

Water is dispersed in the oil phase according to the present invention, dependent upon the required coating composition or use, in any ratio which allows the coating to form. Specifically, water has been dispersed in amounts of up to 80% of the liquid composition through the use of appropriate emulsifying agents. Emulsifiers which have been found useful in the formation of the composition of the present invention are emulsifiers having a hydrophile-lipophile balance number of from one/half to twelve.

The HLB system is a semi-empirical procedure for the selection of an appropriate emulsifier. The procedure is based on the concept that the molecule of any emulsifier contains both hydrophobic and hydrophilic groups, and the ratio of their respective weight percentages should influence emulsification behavior.

The HLB value can be calculated from the theoretical composition of the emulsifier. For example, in determining the HLB for ethylene oxide condensation products, HLB equals one-fifth of the weight percent of the oxyethylene hydrophlic content of the molecule. The HLB of ester emulsifiers may be calculated by the formula HLB=20 (1-S/A), wherein S is the saponfication of the emulsifier and A is the acid number of the fatty acid moiety. Such methods of calculation are known in the art and expressed in a wide variety of publications.

HLB values have also been determined by titration, spreading coefficients, gas-liquid chromatograph techniques and other laboratory methods. Generally, suppliers of commercial proprietary emulsifiers provide an HLB number for their products, and published HLB indices of these materials are known in the art.

According to the present invention, a single emulsifier having an HLB of from two to about six may be used. However, it is preferable to use a blend of emulsifiers, including a continuous phase component as well as an emulsifier for the dispersed phase, which produce an emulsifier system having an HLB of from two to about six. When two or more of these emulsifiers are to be blended the HLB of the combination is calculated by the formula xA+(1−x)B wherein x is the percent proportion of the emulsifier having an HLB of A and B is the HLB of the second emulsifier. It has been found that the most stable emulsion systems comnsist of blends of two or more emulsifiers, one portion having lipophilic tendencies (HLB 0.5 to 5.0), and the other portion having hydrophilic tendencies (HLB 5.0 to 12.0).

EXAMPLE ONE

A gloss black enamel was prepared having the following composition:

| | |
|---|---|
| Carbon black | 1.1% |
| Vinyl toluene modified alkyd resin | 9.5% |
| Aromatic hydrocarbon resin | 5.7% |
| VM & P Naphtha | 15.4% |
| Toluol | 5.7% |
| Xylol | 3.2% |
| Aliphatic hydrocarbon solvent, boiling range, 300°-400° F. | 28.4% |
| Pigment dispersant (Nuosperse 657) | 0.1% |
| Anti-settling agent | 0.1% |
| Mar resistance agent | 0.3% |
| Drier catalyst | 0.1% |
| Sorbitan trioleate (Span 85, HLB 1.8) | 0.32% |
| Polyethylene glycol monooleate (Mapeg 200 MO, HLB 8.0) | 0.08% |
| Water | 30.0% |
| | 100.00% |

The composition was prepared by first combining the pigment, pigment dispersant, anti-settling agent and a portion of the resin and solvent in a mixing vessel as is known in the art. The mixing was continued until the pigment was dispersed to a suitable degree of fineness. Thereafter, the remainder of the resin and solvent was added along with the mar resistance agent and drier catalyst. When the mixing was completed, the oil dispersable emulsifier, HLB 1.8, was stirred into the enamel with a homogenizer-type intensive mixer. After five minutes of mixing, a solution of water and the water dispersable emulsifier, HLB 8.0 is poured into the enamel while under constant mixing. These two emulsifiers, as hereinbefore described, yielded a total emulsifier system value of 80%×1.8+20%×8.0=3.04. The water-in-oil emulsion was formed within five to ten minutes.

EXAMPLE TWO

In a like manner, varnish compositions may be made using the same ingredients, with the omission of the carbon black pigment and pigment related additives. Specifically, a varnish was made having the following composition:

| | |
|---|---|
| Oil modified polyurethane resin (Urotuf 13-309) | 13.9% |
| Mineral spirits (boiling range 307°-389° F.) | 13.9% |
| Aromatic solvent (SC-100, boiling range 311°-344° F.) | 31.7% |
| Aromatic solvent (SC-150, boiling range 362°-410° F.) | 9.4% |
| Drier catalyst | 0.8% |
| Anti-skinning agent | 0.2% |
| Polyoxethylene sorbitol beeswax derivative (Atlas G-1727, HLB 4.0) | 0.2% |
| Water | 30.0% |
| | 100.0% |

SC-100 and SC-150 are known naphtha mixtures containing 98% aromatic material of $C_8$ or higher. Aliphatic naphthas of like boiling ranges may be used and are intended as equivalent.

EXAMPLE THREE

According to the same method, a gloss white enamel was prepared having the following composition:

| | |
|---|---|
| Titanium dioxide | 11.0% |
| Vinyl toluene modified alkyd resin | 14.7% |
| VM & P Naphtha | 14.5% |

-continued

| | |
|---|---|
| Aliphatic hydrocarbon solvent, boiling range, 311°-344° F. (SC-100) | 19.6% |
| Xylol | 7.5% |
| Pigment dispersant (Disperse Ayd No. 1) | 0.2% |
| Anti-settling agent | 1.8% |
| Mar resistance agent | 0.3% |
| Drier catalyst | 0.1% |
| Sorbitan trioleate (Span 85, HLB 1.8) | 0.25% |
| Polyethylene glycol monooleate (Mapeg 200 MO, HLB 8.0) | 0.05% |
| Water | 30.0% |
| | 100.0% |

The compositions described above in examples one through three were each further processed to form aerosol spray coating compositions. After the water-in-oil emulsion described above is formed, the composition was packed in an aerosol can with a suitable propellant, here propane or a mixture of propane, isobutane and/or butane as known in the art. The amount of propellant may vary in accordance with the intended result, but is generally in the ratio of twenty to thirty-five percent propellant by weight in relation to the total composition. A metal or glass object weighing from five to ten grams is customarily added to the can along with the enamel. This object serves as an aid in mixing the pigment, if any, which settles to the bottom of the can during storage.

EXAMPLE FOUR

Black Enamel using an aromatic hydrocarbon resin:

| | |
|---|---|
| Carbon black | 1.2% |
| Aromatic hydrocarbon resin | 19.6% |
| Toluene | 23.4% |
| Hexane | 4.9% |
| Aromatic solvent, boiling range 300°-400° F. | 20.0% |
| Pigment dispersant (Nuosperse 657) | 0.1% |
| Anti-settling agent | 0.2% |
| Mar resistance agent | 0.1% |
| Drier catalyst | 0.1% |
| Sorbitan sesquioleate (Liposorb SQO, HLB 3.7) | 0.32% |
| Diethylene glycol fatty acid ester (Emcol DP-SO, HLB 5.1) | 0.08% |
| Water | 30.00% |
| | 100.00% |

EXAMPLE FIVE

White Ground Marking Paint using an aromatic hydrocarbon resin:

| | |
|---|---|
| Titanium dioxide | 11.34% |
| Calcium carbonate | 2.59% |
| Aromatic hydrocarbon resin | 14.06% |
| Toluol | 14.72% |
| Aromatic hydrocarbon solvent, boiling range 311°-344° F. (SC-100) | 4.47% |
| Anti-settling agent | 1.02% |
| Drier catalyst | 0.22% |
| Pigment dispersant (Nuosperse 657) | 0.34% |
| Sorbitan trioleate (Span 85, HLB 1.8) | 0.24% |
| Polyethylene glycol monooleate (Mapeg 200 MO, HLB 8.0) | 0.06% |
| Water | 50.94% |

-continued

| | |
|---|---|
| | 100.00% |

It has been found that when water is used in excess of 60%, particularly when dispersed in resins having a high viscosity at high solids content, a high viscosity emulsion is produced due to the reduction of the effective amount of solvent for the resin and the internal friction created by the emulsified water. Thus, while high water content may be advantageous in brushed coatings or industrial spray applications, lower viscosity emulsions should be used in the aerosol spray compositions of the present invention.

EXAMPLE SIX

Red Enamel using an epoxy ester resin:

| | |
|---|---|
| Toluidine Red | 1.9% |
| Epoxy ester resin | 14.8% |
| Xylol | 15.9% |
| Aromatic solvent, boiling range 311°-340° F. (SC-100) | 35.3% |
| Pigment dispersant (Nuosperse 657) | 0.06% |
| Anti-settling agent | 0.2% |
| Mar resistance agent | 0.1% |
| Drier catalyst | 1.0% |
| Anti-skinning agent | 0.3% |
| Sorbitan tristearate (Liposorb TS, HLB 2.1) | 0.56% |
| Polyethylene glycol 200 dilaurate (Emerest 2622, HLB 6.2) | 0.08% |
| Water | 29.8% |
| | 100.00% |

EXAMPLE SEVEN

Red Fluorescent Paint using an acrylic resin:

| | |
|---|---|
| Red Fluorescent Pigment | 12.8% |
| Acrylic resin | 4.2% |
| Aliphatic hydrocarbon solvent, boiling range 150°-200° F. | 37.0% |
| Xylol | 15.6% |
| Sorbitan trioleate (Span 85, HLB 1.8) | 0.35% |
| Polyethylene glycol monooleate (Mapeg 200 MO, HLB 8.0) | 0.09% |
| Water | 29.96% |
| | 100.00% |

EXAMPLE EIGHT

Red Iron Oxide Primer using an Epoxy Ester:

| | |
|---|---|
| Red Iron Oxide | 5.4% |
| Yellow Iron Oxide | 1.6% |
| Magnesium Silicate | 6.8% |
| Zinc Phosphate | 2.6% |
| Carbon Black | 0.2% |
| Epoxy ester resin | 8.7% |
| Xylol | 30.4% |
| Toluol | 11.2% |
| Anti-skinning agent | 0.03% |
| Pigment dispersant (Nuosperse 657) | 0.15% |
| Anti-settling agent | 2.12% |
| Drier catalysts | 0.40% |
| Ethylene glycol distearate (Emerest 2355, HLB 1.2) | 0.34% |
| Polyethylene oxide sorbitan tristearate (Liposorb TS-20, HLB 10.5) | 0.09% |
| Water | 29.97% |

-continued

|  |  |
|---|---|
|  | 100.00% |

Each of the compositions hereinbefore described provided a coating comparable to the solution resin coatings as previously known at a markedly lower cost due to the inclusion of water in the composition. The amount of water in the composition is dependent upon the type of film desired and may vary up to 80% of the total composition.

Further, each of the compositions, when sprayed from a standard aerosol container, resisted foaming and formed a smooth, continuous coating heretofore unobtainable in an aerosol water containing paint.

Further compositions were made including standard variations in the percentages of resin, solvent, pigments and other additives as known in the art. Oil modified polyurethane resins, epoxy ester resin, aromatic hydrocarbon resin, aliphatic hydrocarbon resin, vinyl toluene modified oil, solution vinyl resin, silicone resin and solvent soluble acrylics may be selected in accordance with the requirements of the desired application.

From the foregoing description, one skilled in the art can easily ascertain the essential characteristics of the invention, and without departing from the spirit and scope thereof, can make various changes and modifications to adapt the invention to various usages and conditions.

The invention is claimed as follows:

1. An improved water-in-oil emulsion coating composition comprising: (a) a continuous phase, said continuous phase including an organic solvent, said solvent being of aliphatic or aromatic or combined aliphatic and aromatic hydrocarbon composition; (b) a dispersed phase, said dispersed phase including water; (c) a film-forming resin dissolvable in said solvent, said continuous phase further including an effective amount of said resin for forming a film on a workpiece; and, (d) an emulsifier, said coating composition including an effective amount of said emulsifier for maintaining stable dispersion of said dispersed phase throughout said continuous phase, said emulsifier having an HLB value of from 2 to about 6, whereupon said coating composition has as much as 80 percent water on a weight basis, said water thereby extending said solvent as to said coating composition, said water being substituted for said solvent throughout said coating composition.

2. The improved water-in-oil emulsion coating composition of claim 1 wherein said film-forming resin has a high resistance to hydrolysis and is selected from the group consisting of modified vinyl-toluenes, oil-modified polyurethanes, modified styrenes, epoxy esters, solution vinyls, silicones and mixtures thereof.

3. An improved water-in-oil emulsion coating composition comprising: (a) a continuous phase, said continuous phase including an organic solvent, said solvent being of aliphatic or aromatic or combined aliphatic and aromatic hydrocarbon composition; (b) a dispersed phase, said dispersed phase including water; (c) a film-forming resin dissolvable in said solvent, said continuous phase further including an effective amount of said resin for forming a film on a workpiece; and, (d) an emulsifier system, said coating composition including an effective amount of said emulsifier system for maintaining stable dispersion of said dispersed phase throughout said continuous phase, said emulsifier system including at least two emulsifying components, a first emulsifying component having an HLB value of from ½ to 5, a second emulsifying component having an HLB value of from 5 to 12, an HLB value for said emulsifier system being a weighted average of said respective HLB values of said first and said second emulsifying components, said emulsifier system having an HLB value of from 2 to about 6, whereupon said coating composition has as much as 80 percent water on a weight basis, said water thereby extending said solvent as to said coating composition, said water being substituted for said solvent throughout said coating composition.

4. The improved water-in-oil emulsion coating composition of claim 3 wherein said film-forming resin has a high resistance to hydrolysis and is selected from the group consisting of modified vinyl-toluenes, oil-modified polyurethanes, modified styrenes, epoxy esters, solution vinyls, silicones and mixtures thereof.

5. The improved water-in-oil emulsion coating composition of claim 1 or claim 2 or claim 3 or claim 4 wherein said organic solvent has a distillation range of from 100 to 500 degrees Fahrenheit and is selected from the group consisting of esters, ketones, glycol ethers, alcohols and mixtures thereof.

6. The improved water-in-oil emulsion coating composition of claim 5 wherein, said continuous phase includes an effective amount of paint pigment particles for providing said coating composition with a desired color, said continuous phase further including an effective amount of a pigment dispersant for maintaining stable dispersion of of said pigment particles throughout said continuous phase of said coating composition.

7. The improved water-in-oil emulsion coating composition of claim 6 wherein said coating composition ranges from about 29 percent to about 51 percent water on a weight basis.

8. A method of manufacturing an improved water-in-oil emulsion coating composition, said coating composition having a continuous phase and a dispersed phase, said continuous phase including an organic solvent, said dispersed phase including water, said coating composition including an effective amount of an emulsifier for maintaining stable dispersion of said dispersed phase throughout said continuous phase, said method comprising: (a) adding to said solvent an effective amount of a film-forming resin thereby producing a mixture, said resin being soluble in said solvent, said solvent being of aliphatic or aromatic or combined aliphatic or aromatic hydrocarbon composition; and, (b) adding to said mixture a first effective amount of said emulsifier and to said dispersed phase a second effective amount of said emulsifier for maintaining stable dispersion of said dispersed phase throughout said continuous phase and thereafter mixing said dispersed phase and said mixture thereby producing said water-in-oil emulsion capable of forming a film on a workpiece, said emulsifier having an HLB value of from 2 to about 6, whereupon said coating composition has as much as 80 percent water on a weight basis, said water thereby extending said solvent as to said coating composition, said water being substituted for said solvent throughout said coating composition.

9. The method of claim 8 wherein said film-forming resin has a high resistance to hydrolysis and is selected from the group consisting of modified vinyl-toluenes, oil-modified polyurethanes, modified styrenes, epoxy esters, solution vinyls, silicones and mixtures thereof.

10. A method of manufacturing an improved water-in-oil emulsion coating composition, said coating composition having a continuous phase and a dispersed phase, said continuous phase including an organic solvent, said dispersed phase including water, said coating composition including an effective amount of an emulsifier system for maintaining stable dispersion of said dispersed phase throughout said continuous phase, said emulsifier system including at least two emulsifying components, a first emulsifying component having an HLB value of from ½ to 5, a second emulsifying component having an HLB value of from 5 to 12, an HLB value for said emulsifier system being a weighted average of said respective HLB values of said first and said second emulsifying components, said method comprising: (a) adding to said solvent an effective amount of a film-forming resin thereby producing a mixture, said resin being soluble in said solvent, said solvent being of aliphatic or aromatic or combined aliphatic and aromatic hydrocarbon composition; and, (b) adding to said mixture an effective amount of said first emulsifying component and to said dispersed phase an effective amount of said second emulsifying component for maintaining stable dispersion of said dispersed phase throughout said continuous phase and thereafter mixing said dispersed phase and said mixture thereby producing said water-in-oil emulsion capable of forming a film on a workpiece, said emulsifier system having an HLB value of from 2 to about 6, whereupon said coating composition has as much as 80 percent water on a weight basis, said water thereby extending said solvent as to said coating composition, said water being substituted for said solvent throughout said coating composition.

11. The method of claim 10 wherein said film-forming resin has a high resistance to hydrolysis and is selected from the group consisting of modified vinyl-toluenes oil-modified polyurethanes, modified styrenes, epoxy esters, solution vinyls, silicones and mixtures thereof.

12. The method of claim 8 or claim 9 or claim 10 or claim 11 wherein said organic solvent has a distillation range of from 100 to 500 degrees F. and is selected from the group consisting of esters, ketones, glycol ethers, alcohols and mixtures thereof.

13. The method of claim 12 wherein said coating composition is between 29 percent and 51 percent water on a weight basis.

* * * * *